(12) United States Patent
Shirani et al.

(10) Patent No.: US 10,400,923 B2
(45) Date of Patent: Sep. 3, 2019

(54) GASKET WITH MULTIPLE SEAL RINGS

(71) Applicant: OneSubsea IP UK Limited, London (GB)

(72) Inventors: Alireza Shirani, Houston, TX (US); Marcus Lara, Houston, TX (US); Phillip Michael Theriot, Houston, TX (US); Brian Glassman, Houston, TX (US)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 15/954,277

(22) Filed: Apr. 16, 2018

(65) Prior Publication Data
US 2018/0231158 A1   Aug. 16, 2018

Related U.S. Application Data

(63) Continuation of application No. 15/356,437, filed on Nov. 18, 2016, now abandoned, which is a
(Continued)

(51) Int. Cl.
| | |
|---|---|
| *F16J 15/06* | (2006.01) |
| *F16L 17/073* | (2006.01) |
| *E21B 33/038* | (2006.01) |
| *F16J 15/00* | (2006.01) |
| *F16J 15/02* | (2006.01) |

(Continued)

(52) U.S. Cl.
CPC ............ *F16L 17/073* (2013.01); *E21B 17/04* (2013.01); *E21B 17/085* (2013.01); *E21B 33/038* (2013.01); *F16J 15/002* (2013.01); *F16J 15/02* (2013.01); *F16J 15/061* (2013.01); *F16J 15/062* (2013.01); *F16J 15/0887* (2013.01); *F16J 15/106* (2013.01); *F16L 17/08* (2013.01); *F16L 23/20* (2013.01); *F16L 23/22* (2013.01)

(58) Field of Classification Search
CPC .. F16J 15/00; F16J 15/02; F16J 15/021; F16J 15/022; F16J 15/06; F16J 15/061
See application file for complete search history.

(56) References Cited

U.S. PATENT DOCUMENTS

| | | | |
|---|---|---|---|
| 3,141,685 A | 7/1964 | Watts | |
| 6,336,641 B1 | 1/2002 | Williams | |
| (Continued) | | | |

FOREIGN PATENT DOCUMENTS

| | | |
|---|---|---|
| CN | 201588587 U | 9/2010 |
| DE | 212013000004 U1 | 10/2013 |
| GB | 2286861 A | 8/1995 |

*Primary Examiner* — Gilbert Y Lee
(74) *Attorney, Agent, or Firm* — Eubanks PLLC

(57) ABSTRACT

A gasket capable of sealing against multiple sealing surfaces, comprising an inner seal ring for sealing against inner sealing surfaces, an outer seal ring for sealing against outer sealing surfaces, one or more intermediate seal rings for sealing against one or more intermediate sealing surfaces, and a connector member for connecting the inner seal ring, one or more intermediate seal rings and the outer seal ring. In some embodiments, the gasket includes a retaining feature for securing the gasket in place and a removal feature for removing the gasket. In some embodiments, the various components of the gasket (e.g., seal rings, connector members, retaining feature, etc.) are composed of different materials (e.g., metal, metal alloy, plastic, rubber, ceramic and/or glass).

10 Claims, 3 Drawing Sheets

Related U.S. Application Data continuation-in-part of application No. 14/469,505, filed on Aug. 26, 2014, now abandoned.

(60) Provisional application No. 61/919,447, filed on Dec. 20, 2013.

(51) Int. Cl.
*F16J 15/08* (2006.01)
*F16J 15/10* (2006.01)
*E21B 17/04* (2006.01)
*E21B 17/08* (2006.01)
*F16L 17/08* (2006.01)
*F16L 23/20* (2006.01)
*F16L 23/22* (2006.01)

(56) References Cited

U.S. PATENT DOCUMENTS

| | | |
|---|---|---|
| 2010/0320699 A1 | 12/2010 | Takeda et al. |
| 2011/0240647 A1 | 10/2011 | Broyles et al. |
| 2011/0266797 A1 | 11/2011 | Stobbart |
| 2012/0056385 A1 | 3/2012 | Prehn |
| 2014/0259606 A1 | 9/2014 | Hedger et al. |
| 2015/0176744 A1 | 6/2015 | Glassman et al. |
| 2017/0067583 A1 | 3/2017 | Illakowicz et al. |

GASKET WITH MULTIPLE SEAL RINGS

CROSS-REFERENCE TO RELATED APPLICATIONS

This application is a continuation of U.S. patent application Ser. No. 15/356,437, filed on Nov. 18, 2016, which is a continuation-in-part of U.S. patent application Ser. No. 14/469,505, filed on Aug. 26, 2014, which claims benefit of U.S. Provisional Patent Appl. No. 61/919,447, filed on Dec. 20, 2013, each of which is incorporated herein by reference.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

The oil industry is moving towards higher pressure systems in order to recover more oil at faster rates, drill in deeper water depths, drill deeper wells and increase shut-in capacities for safer well operations. One issue with high pressure systems (about 15,000 psi to about 30,000 psi and above) is they exert tremendous forces on the gaskets. Especially in the case of larger bore systems which use 18-inch or larger gaskets, the gasket could have to hold back radial forces in excess of 1,000,000 lbs. Existing gaskets are not designed to cope with the large radial forces and resultant stresses produced by these high pressure systems.

There is a strong need to create a gasket which can sustain forces and reduce internal stresses generated during high pressure operations while maintaining a high performance seal throughout multiple cycles and temperature ranges.

Further, while safety is another priority in this industry, existing gaskets only provide a single seal barrier which in many instances can be defeated through wear from operation, unwanted pressure surges and/or other unforeseen instances. Therefore there is also a clear need for a multi-barrier seal that provides superior reliability under severe applications.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Disclosed is a gasket capable of sealing against multiple sealing surfaces. The gasket includes at least two seal rings for sealing against at least two sealing surfaces and a connector member for connecting the at least two seal rings. In some embodiments, the gasket includes a retaining feature for securing the gasket in place and a removal feature for removing the gasket. In some embodiments, the various components of the gasket (e.g., seal rings, connector members, retaining feature, etc.) are composed of different materials (e.g., metal, metal alloy, plastic, rubber, ceramic and/or glass).

This summary is provided to introduce a selection of concepts that are further described below in the detailed description. This summary is not intended to identify key or essential features of the claimed subject matter, nor is it intended to be used as an aid in limiting the scope of the claimed subject matter.

DESCRIPTION OF THE DRAWINGS

For a detailed description of the preferred embodiments of the invention, reference will now be made to the accompanying drawings in which.

DETAILED DESCRIPTION

Figure 1:
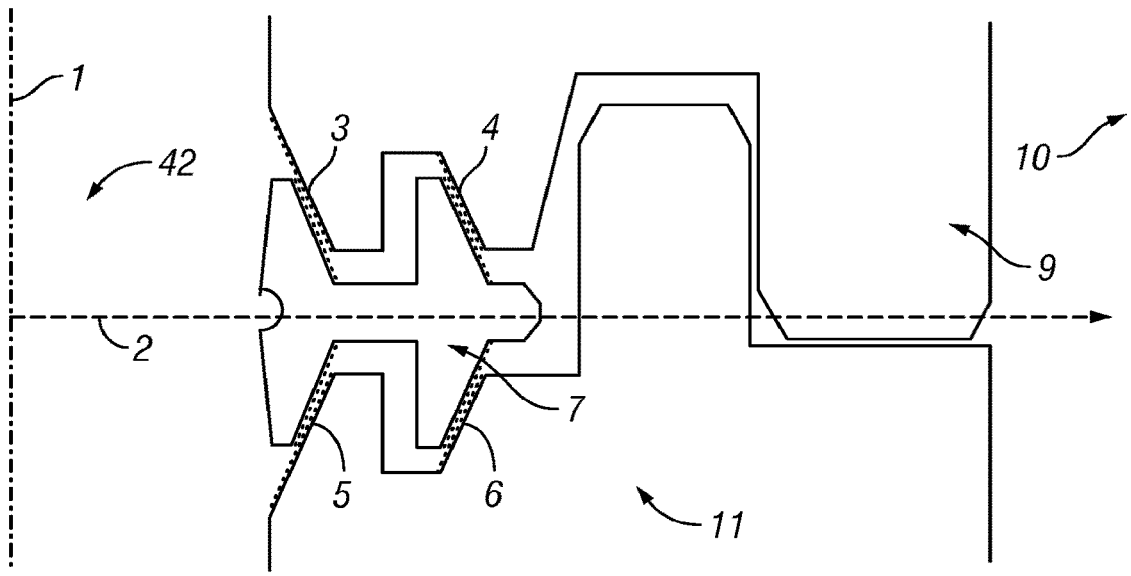
FIG. 1 shows a cross sectional view of the disclosed gasket and respective sealing surfaces in a position prior to mating.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. In the following discussion and in the claims, the terms "including" and "comprising" are used in an open-ended fashion, and thus should be interpreted to mean "including, but not limited to . . . " The use of "top," "bottom," "above," "below," and variations of these terms is made for convenience, but does not require any particular orientation of the components.

The disclosed gasket can provide a seal, for example a metal-to-metal seal, between pipes, hubs, trees, manifolds, flow-lines, connectors, pig launchers or anything similar in function or form. Referring to FIG. 1, one embodiment of the gasket 7 is shown. The gasket creates a seal between two surfaces of elements (e.g., mating hubs), referenced respectively, 9, 11. In the illustrated embodiment, the gasket 7 is capable of holding back pressurized fluids and/or gasses from inside 42 a sealing bore and outside 10 the sealing bore.

The gasket 7 material may be made out of one or more of metal, metal alloy, plastic, rubber, ceramic, and glass. The preferred embodiment is specifically made out of one or more INCONEL® materials, which is a proprietary family of austenitic nickel-chromium super alloys. The gasket 7 material may be made out of a homogenous or non-homogenous material. The gasket 7 material may have voids which may react when pressurized. The gasket 7 material may be a high yield metal alloy with yields above 80,000 psi, or a low yield material with yields below 80,000 psi. The gasket 7 material may be made highly resistant to corrosion that might be caused by oil and gas rich fluids.

Figure 3:
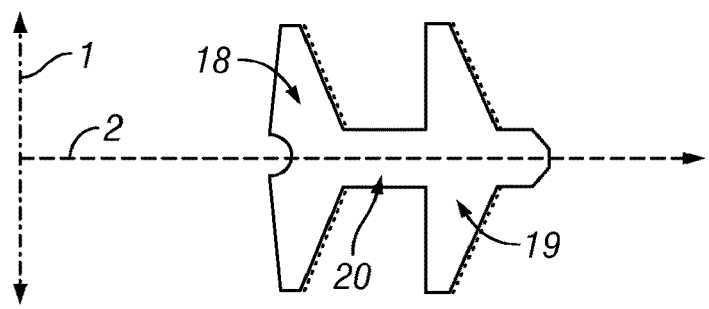
FIG. 3 shows a cross sectional view of the disclosed gasket.
Figure 4:
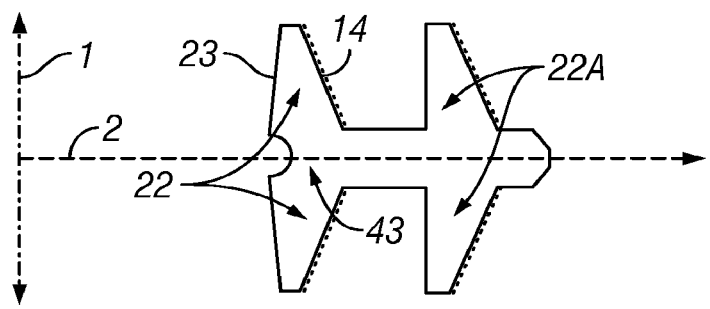
FIG. 4 shows a cross sectional view of the disclosed gasket.

Referring to FIGS. 3 and 4, additional embodiments of the gasket 7 are shown. The gasket 7 may be composed of two or more seal rings 18, 19, linked by a connector member (e.g., a seal web) 20. The cross-section of the inner seal ring 18 shows two seal arms 22 that are mirrored about a line 2 (the "gasket horizontal axis") which runs through the center of the seal ring 18. The cross-section of the outer seal ring 19 shows two seal arms 22A that are mirrored about the line 2. In this embodiment, the seal arms cross sections might be revolved about the bore axis line 1 to form the seal rings. In other embodiments, the seal arms may not be mirrors of each other but may have different configurations above and below line 2.

The seal rings 18, 19 might be arranged so the inner seal ring 18 is identified as the one closer to the bore axis line 1 and the seal ring 19 farthest from the bore axis line 1 is identified as the outer seal ring. In other embodiments, there could be several additional seal rings between the inner seal ring 18 and the outer seal ring 19. These additional seal rings can be arranged along the axis 2, or can be positioned above or below that axis.

Figure 2:
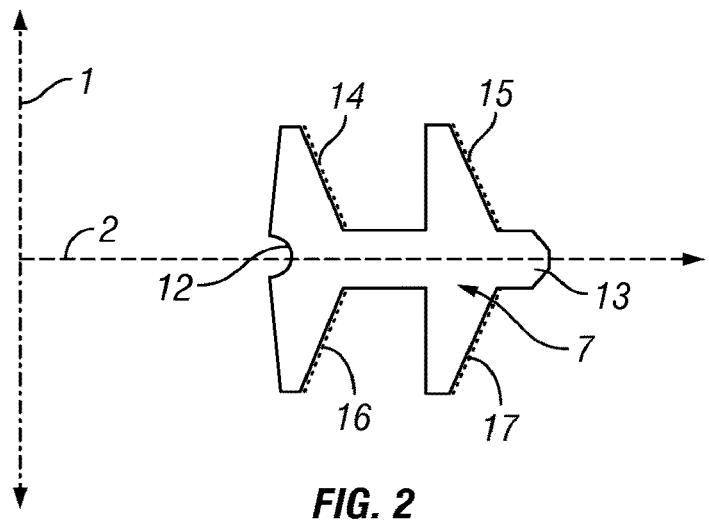
FIG. 2 shows a cross sectional view of the disclosed gasket.

Referring to FIG. 2, the cross sectional view of the seal arms 22 shows sealing surfaces 14 and 16 and the cross sectional view of the seal arms 22A shows sealing surfaces 15 and 17, facing away from the bore centerline. The inner surface 23 of the inner seal ring 18 faces the bore centerline 1 and may be parallel to the bore centerline. In other embodiments, the inner surface 23 of the seal arms 22 can be angled or parallel in respect to the bore centerline. The sealing surfaces 14-17 of the seal arms may be straight, angled, curved, or any suitable shape. Further, each of the seal arms 22, 22A may have one or more sealing surfaces.

The seal arms 22 can behave as a cantilever beam which is affixed to a rigid support where the rigid support may resemble the seal base 43. The seal arms 22 under pressure from the bore 42 may bend outwards so that the top of the seal arm 22 moves away from the bore centerline 1. The amount of that displacement may be determined by the amount of bore pressure and/or the variable stiffness of the seal arm cross sectional profile. The sealing surfaces 14 and 16 of seal arms 22, and sealing surfaces 15 and 17 of seal arms 22A, under pressure from the bore, may be pushed against the elements seal surfaces 3 and 5, and 4 and 6 respectively, which may increase the ability of the gasket 7 to seal under pressure. The seal arms 22A, under pressure from external pressure 10, may at the tip of the seal arms move some amount of displacement toward the bore centerline 1.

The connector member 20 may link any number of seal rings. The connector member 20 may connect the seals rings axially, which is shown in the figures in a direction roughly parallel to the horizontal axis 2. The connector member 20 may form an integrated piece with the seal ring(s) or the connector member may be machined, welded, or otherwise rigidly affixed to the one or more seal rings. The connector member 20 may be made out of a different material than the seal rings, which enables customization to the amount of deflection which will occur between the seal rings.

In some embodiments, the connector member 20 may link the seal rings via a strong, weak, or flexible connection which transfers all or some of the amount of force, moments, stress, heat, and deflection from one seal ring to another. The connector member 20 may resemble a flat disk which can be continuous, slotted, or discontinuous in nature. The connector member 20 may also be in the form of other suitable shapes. For a gasket with multiple seal rings, multiple connector members can be present and link any number of seal rings in the manner described above.

Referring to FIG. 2, one embodiment of the proposed gasket 7 may contain a removal feature 12. This removal feature 12 allows a removal tool to detach, remove, and extract the gasket from its seating, position or orientation in the elements 9 and 11. As shown in FIG. 2, the removal feature 12 may be located on the inner surface 23 of the inner seal ring 18. The removal feature 12 may be in the center or close to axis 2 of the inner seal ring 18. The removal feature may also be located on the outer seal ring 19. The removal feature may also be located at any of the existing features on the gasket 7 including, but not limited to, the seal rings, seal arms, or any other location of the gasket 7. The removal feature 12 may be a cut or extruding feature in any shape, including at least one of a circle, square, triangle, or otherwise. The removal feature 12 may have a surface texture or surface coating applied to it. The removal feature 12 may also be any combination of cuts, holes, or notches on any one of the seal base 43 and/or connector member 20.

Referring again to FIG. 2, the gasket 7 may contain a retaining feature 13. The retaining feature 13 may be a feature on the outer seal ring 19 which retains the gasket 7 into a receiver hub or other element or piece of equipment, i.e., in a sealing position. This retaining feature may be a ring 13 extending from the outer seal ring 19. The retaining feature 13 may be a single, continuous, discontinuous, or a series of slot(s), pin(s), lip(s), indent(s), round(s), chamfer(s), hole(s), and/or series of holes. The retaining feature 13 may affix the gasket 7 by ways of a spring force, interference fit, slotting arrangement, treading arrangement, or a set of spring loaded pins, latches, or other means. One example of a retaining feature would be a ring which extends from the center of the outer seal ring 19 and might be square, round, chamfered, or cut. A set of one or more retaining pins, not shown, can engage the retaining feature from a mating hub 11.

The gasket sealing surfaces engage with surfaces of the elements 9 and 11 in such a way to create a contact pressure in excess of the fluid pressure which the gasket 7 will be sealing against. The gasket 7 sealing surfaces may exist at an angle with respect to the bore axis line 1, in one example forming a conical surface. The sealing surfaces may also be rounded if viewed in a cross sectional view and form a spherical surface. The sealing surfaces of the inner seal ring 18 and the outer seal ring 19 may be at different heights with respect to the axis 2 and may have different angles, cross sections, and shapes. Further, the ratio of the stiffness of the inner seal ring 18 to the outer seal ring 19 may be greater, less than, or equal to 1. The ratio of the average stress on the inner seal ring 18 to the outer seal ring 19 may be greater, less than, or equal to 1. The ratio of the amount of strain accumulated on the inner seal ring 18 to the outer seal ring 19 may be greater, less than, or equal to 1. Surfaces of the elements 9 and 11 which mate with each sealing ring on the gasket 7 may be similar in geometry or different from each other.

Figure 5:
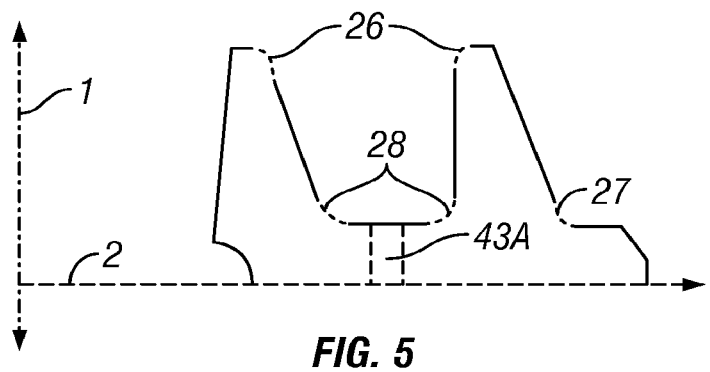
FIG. 5 shows a cross sectional view of the disclosed gasket.

Referring to FIG. 5, another embodiment is shown. In this embodiment of the proposed gasket 7, one or more chamfer or radius 26 may exist on either or all of the top edges (or lips) of the seal arms 22 and 22A.

The seal lip chamfer 26 acts to prevent scoring, abrasion, and/or damage to the gasket sealing surfaces 14-17, the surfaces of the elements 3-6, or other mating equipment. The seal lip chamfer 26 acts to remove dirt, debris, or other contaminants from the gasket seal surfaces 14-17 and/or the elements surfaces during the mating of the gasket to the respective surfaces 3-6 of the elements. The seal lip chamfer 26 may be coated in a low friction coating which may aid in mating or setting the gasket 7.

Referring again to FIG. 5, there also may be one or more chamfer(s) or rounds 28 at the intersection between the seal arms and connector member 20. The base chamfer 28 may reduce internal stresses in the gasket 7, reduce internal plastic deformation in the gasket 7, provide additional flexural stiffness to the seal rings or seal arms, and increase or decrease the transfer of force, moments, stress, heat, and deflection from one seal ring to another.

Referring again to FIG. 5, there also may have one or more retaining chamfer(s) 27 at the intersection between the seal ring and the retaining feature 13. The retaining chamfer 27 may provide additional flexural stiffness to the seal rings or seal arms it contacts, reduce internal stresses in the gasket 7, reduce internal plastic deformation in the gasket and/or provide a smooth transition to avoid having the retaining feature 13 catch or snag on the gasket mating surface.

Referring yet again to FIG. 5, the gasket 7 may have one or more holes 43A drilled in an axial direction across the connector member 20 as shown in FIG. 5. The hole(s) may allow pressure to equalize between the sections of the gasket 7 from each side of the axis 2.

Figure 7:
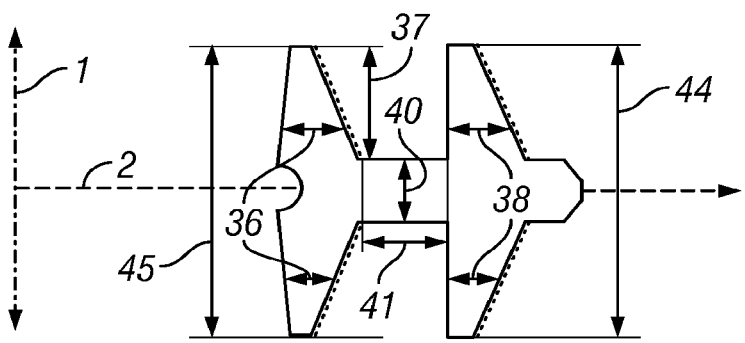
FIG. 7 shows a cross sectional view of the disclosed gasket showing several thicknesses and heights on the gasket's geometry.

Referring to FIG. 7, the gasket may have features within a specific or general range of ratios in relation to each other. For example, the thickness profile 36 of the inner seal ring 18 may be greater, equal to, or smaller than the thickness profile 38 of the outer seal ring 19. In other embodiments, the ratio of the inner seal ring height 45 to the outer seal ring height 44 may be greater, less than, or equal to 1. The ratio of a seal arm height 37 to the connector member thickness 40 may be greater, less than, or equal to 1. The ratio of the connector member length 41 to the inner or outer seal ring thickness 36,38 may be greater, less than, or equal to 1.

In another embodiment of the disclosed gasket 7, sealing surfaces 14-17 may be located on a portion only or cover the full area of the sealing arms 22 and 22A. The sealing surfaces 14 and 16 on the inner seal ring 18 may be the same dimension or a different dimension from the sealing surfaces 15 and 17 on the outer seal ring 19. The sealing surfaces 14-17 may be flat or non-flat. The sealing surfaces 14-17 may be continuous or discontinuous in that the sealing surfaces 14-17 might be broken by cuts, internal ribs cuts, indents, or other features which revolve about axis 1 and may form a single or multiple angled conical sealing surface if viewed three dimensionally. The sealing surfaces 14-17 may be composed of a radius if viewed in a cross sectional view as referenced in sealing surface 30 in FIG. 6, and could form a spherical sealing surface if viewed three dimensionally.

The gasket sealing surfaces 14-17 mate with respective sealing surfaces on the elements 9 and 11. The amount of interference between the gasket sealing surfaces 14-17 and the surfaces of the elements 9 and 11 may vary depending on the chosen sealing surface profile. When the sealing surfaces 14-17 of the proposed gasket 7 come into contact with the elements 9 and 11 upon make-up, they create a sealing contact pressure.

The sealing surfaces 14-17 or the entire outer surface of the gasket 7 may be coated with a metal, ceramic, plastic, or other coating substance. The sealing surfaces 14-17 may be composed of, but are not limited to, metal or amalgams made of silver, gold, lead, or other low-yield metals or metal compounds. The sealing surfaces 14-17 may be fully or partially coated with these substances and may be of any thickness. The coating on the sealing surfaces 14-17 may be selected for its lubrication effect under high contact pressures. The coating may reduce the coefficient of friction between the gasket sealing surfaces 14-17 and the mating sealing surface, increase the gasket 7 resistance to corrosion, distribute contact pressure over a larger area, increase the sealing surfaces 14-17 resistance to scratching and abrasions, move or in some means fill-in or neutralize cracks, defects, scratches, or cuts, thereby increasing the sealing surfaces' 14-17 ability to provide a seal, smooth the sealing surfaces 14-17, inhibit the growth of micro-organisms, change the thermal conductance, or inhibit the buildup of hydrates or other chemicals forming out of bore fluid.

Figure 6:
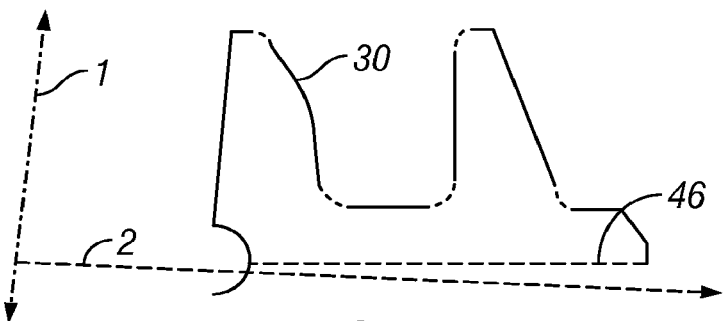
FIG. 6 shows a cross sectional view of the disclosed gasket showing misalignment with the elements.

Referring to FIG. 6, another embodiment of the disclosed gasket 7 is shown. The gasket 7 may be designed to provide a seal under modes of operation where eccentricity or misalignment with the elements 9 and 11 and sealing surfaces 14-17 occurs. The gasket 7 may cope with large amounts of eccentricity while still proving adequate sealing and contact pressures.

In some embodiments, the gasket 7 may deal with large eccentricity by having conical or spherical sealing surfaces. The points of maximum contact pressure may move upwards or downwards on the sealing surface of the elements 9 and 11 or move upwards or downwards on the sealing surface of the gasket 7 to compensate for the eccentricity or misalignment. The connector member 20 of the gasket 7 may provide alignment and aid in rolling the outer seal ring 19 to the appropriate angle for providing maximum sealing pressures. In cases of eccentricity, the gasket 7 may be rolled or angled. An example of this can be seen in FIG. 6, which shows the gasket's 7 horizontal axis 46 at an angle in respect to the bore central axis 2.

Figure 9:
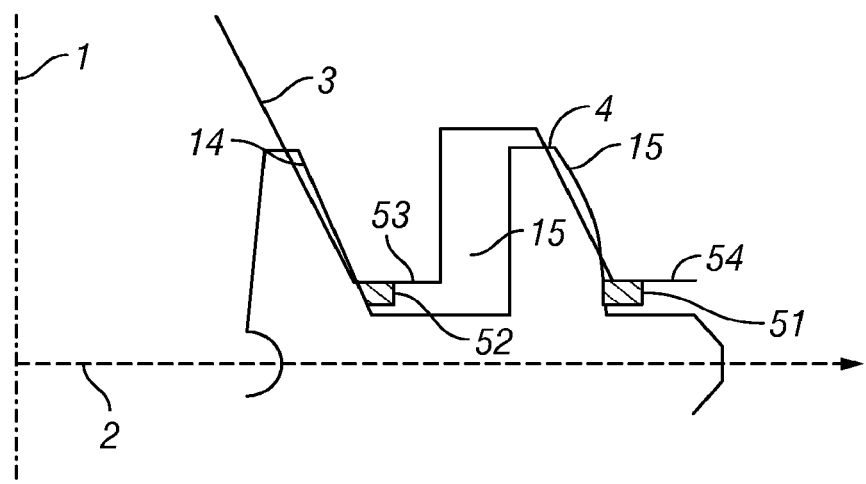
FIG. 9 shows another cross section of an initial interference of the disclosed gasket seal surface to the hubs seal surfaces.

Referring now to FIG. 9, another embodiment of the disclosed gasket 7 is shown. The gasket 7 may be set or fully closed between the elements seal surfaces 3-6 in the air or a subsea condition of any depth thereby creating the pressure capable seal. Setting the gasket may occur with large forces placed on the connecting hubs in bore axis 1, gasket horizontal axis 2 or in any other combination. These large forces may cause the gasket 7 to unduly roll during closing, as illustrated in FIG. 6. Roll limiter rings may be placed on any number of inner seal arms 22, outer seal arms 22A, or connector member 20. The outer 51 and inner 52 roll limiter rings illustrated in FIG. 9 may be an extrusion off the seal surfaces 14-17. The roll limiter rings 51 and 52 may limit the gasket's 7 roll by contacting the hub's horizontal surfaces 53 and 54.

Figure 8:
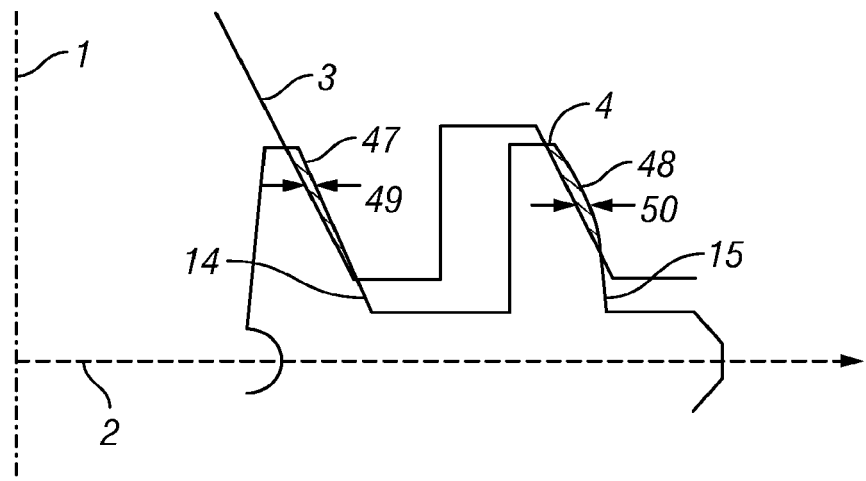
FIG. 8 shows a cross section of an initial interference of the disclosed gasket seal surfaces to the hubs seal surfaces.

Referring now to FIG. 8, another embodiment of the disclosed gasket is shown. The amount of contact pressure created at the seal surfaces may depend upon the initial interferences of the gasket seal surfaces 14-17 to the elements seal surfaces 3-6 and the applied pressures loads. The initial interference of the gasket seal surfaces 14-17 to the elements seal surfaces 3-6 can be seen in a cross section in FIG. 8 as un-deformed overlay of the gasket 7 over the hubs in their fully closed position. FIG. 8 shows an example of an interference zone 47 of a conical gasket seal surface and a conical hub sealing surface and interference zone 48 is of an outer spherical gasket seal surface to a conical hub sealing surface. The interference zones of the inner 18 and outer seal rings 19 may be different or the same. The thickness of interference zones as measured horizontally across the interference zone of the inner seal rings 49 may be greater than, equal to, or less than the outer seal rings 50.

In some applications, the seal arms 22 may experience significant compressive hoop stress. The seal rings 18 and 19 may display significant radial compressive stresses more toward the inner surface 23 of the seal ring 18 and display tensile stress on the external facing side 14. The connector member 20 may experience significant hoop stress.

During one mode of operations where the bore pressure is exerted on the inner surface 23 of the seal ring 18, the gasket 7 may experience significant radial forces. These radial forces may be distributed along the inner seal ring sealing surfaces 14, 16, consequently increasing seal contact pressures. The radial forces may also be distributed via the connector member 20 to the sealing surfaces 15, 17 on the outer seal ring 19. By distributing the bore pressure load to a plurality of seal surfaces, one enables reduction in stress in the inner seal ring 18, reduction in stress in the outer seal ring 19, lower contact pressure in the inner seal ring 18, lower contact pressure in the outer seal ring 19, lower amounts of plastic deformation on the inner seal ring 18, and lower amounts of plastic deformation on the outer seal ring 19.

The distribution of load within the gasket 7 may be controlled by the thickness of the connector member 20, by varying any of the mentioned ratios, by varying the means of linking as mentioned in the connector member 20 section, by varying the amount of interference on the inner 18 and outer seal rings 19 and/or by varying any mentioned feature or function of the gasket.

In other mode of operation, pressure may be generated by the hydrostatic pressure of sea water or other fluid and may act on the surface of the inner 18 or outer seal rings 19. This may create a radial force compressing the gasket 7 inwards towards the centerline of the bore 1. The connector member 20 may distribute any portion of this load so that it distributed over the inner and outer seal surfaces. This may serve to lower the forces and deflections which occurs due to external pressure and may increase the performance of the gasket 7 in respect to resisting external pressure.

While the subject disclosure is described through the above embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures.

What is claimed is:

1. A gasket for sealing between two elements in a closed position, each element including an inner bore and first and second element sealing surfaces facing inwardly toward the inner bore, the gasket comprising:
   an inner seal ring comprising an inner ring sealing surface facing outward and configured to seal in an outward direction against the element first sealing surfaces;
   an outer seal ring comprising an outer ring sealing surface facing outward and configured to seal against the element second sealing surfaces in the same outward direction as the inner ring sealing surface; and
   a connector member flexibly connecting the inner and outer seal rings to allow deflection to occur between the seal rings;
   wherein the inner ring sealing surface and the outer ring sealing surface are spherical.

2. The gasket of claim 1, wherein the connector member comprises a web of a different material than the inner seal ring or the outer seal ring.

3. The gasket of claim 1, wherein the connector member, inner seal ring, and outer seal ring comprise one integrated piece formed of the same material.

4. The gasket of claim 1, wherein the connector member is configured to translate a force from one of the seal rings to the other seal ring with the elements in the closed position.

5. The gasket of claim 1, wherein each of the inner and outer seal rings further comprise an upper sealing arm and a lower sealing arm.

6. The gasket of claim 5, wherein the inner ring upper and lower sealing arms and the outer ring upper and lower sealing arms each comprise one or more sealing surfaces.

7. The gasket of claim 1, wherein the gasket comprises one or more of metal, metal alloy, plastic, rubber, ceramic, glass, or any combination thereof.

8. The gasket of claim 1, wherein the gasket comprises an austenitic nickel-chromium alloy.

9. The gasket of claim 1, further comprising a retaining feature shaped to retain the gasket in a sealing position, wherein the retaining feature extends from the outer seal ring.

10. The gasket of claim 1, further comprising a removal feature shaped to allow removal of the gasket from contact with the sealing surfaces, wherein the removal feature extends from or into the gasket and the removal feature is shaped to facilitate removing the gasket from a sealing position.

* * * * *